Patented May 19, 1936

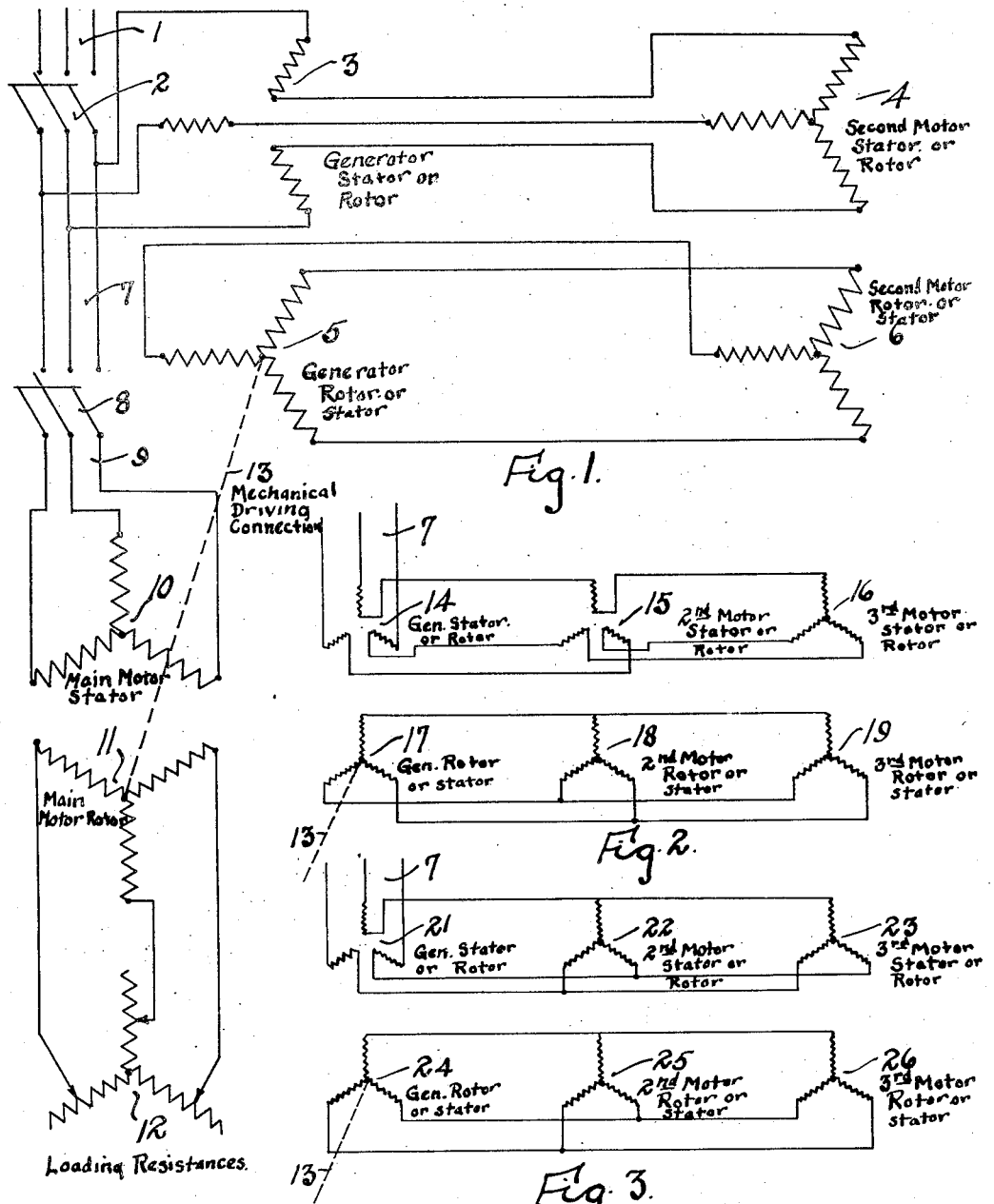

2,041,510

UNITED STATES PATENT OFFICE 2,041,510

SYNCHRONOUS MOTOR DRIVE

Edward G. Parvin, Roselle, N. J., assignor to National Pneumatic Company, New York, N. Y., a corporation of West Virginia Application October 12, 1934, Serial No. 748,026

13 Claims. (Cl. 172—293)

This invention relates to improvements in synchronous motor drives by means of which two or more rotatable members may be started in and driven at absolute synchronism while each is revolving at the same or different speeds.

An important object of this invention is to provide an interconnected motor drive system in which the motors and the apparatus driven thereby are electrically tied together so that movement of any motor of the system will cause the same or a proportionate movement of all the other motors in the system.

These and other objects, as will appear from the following disclosure are secured by means of this invention.

This invention resides substantially in the combination, construction, arrangement and relative location of parts, in accordance with the following disclosure and claims.

In the drawings,

Fig. 1 is a diagrammatic illustration of a system in accordance with this invention employing two operating motors;

Fig. 2 is a diagrammatic illustration of a similar system employing three operating motors; and Fig. 3 is a diagrammatic view of a modified form of three motor drive system;

Figure 4:
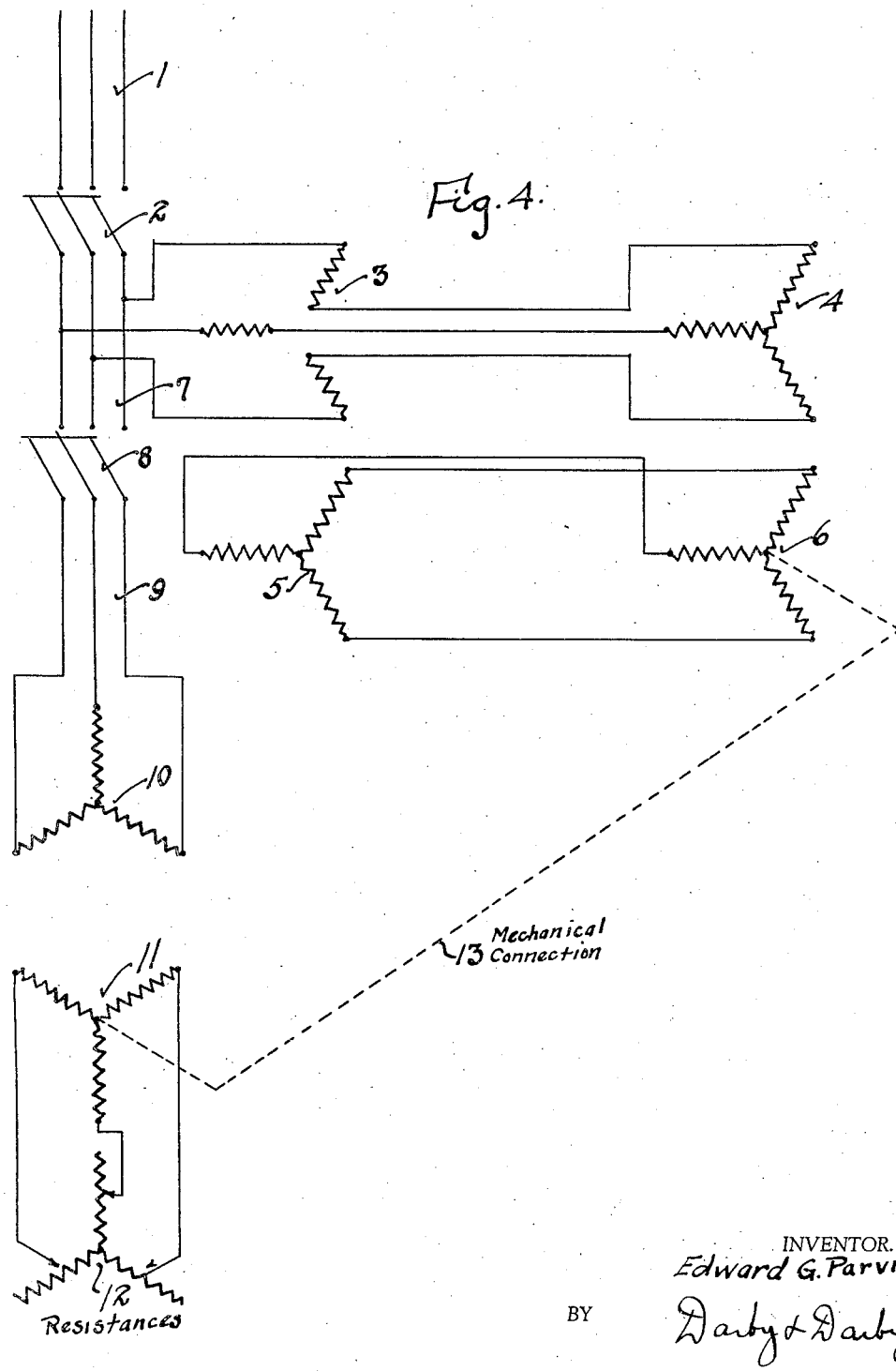
Fig. 4 is a diagrammatic illustration of a still different modification of the system.

In many industries today it is highly desirable to be able to drive, by means of electric motors, and without the use of gear or belt connections, two or more rotatable members at the same speed or at predetermined speed ratios which are maintained constant. Such drive systems are frequently employed in bottle making machinery, vertical lift bridges, feeder voltage regulators, steelmill rolls, paper machinery, printing presses, wire insulating machines, and the like.

For example, in wire insulating machines it is common practice to advance the wire core longitudinally of its length, and to apply to the surface thereof in a helical wrap composed of overlapping portions, a tape of insulating material. In the proper operation of such a machine the rate of application of the tape to the core must be accurately maintained in order that the overlap between adjacent turns may be maintained constant. Furthermore, the relative rates of movement of the core and the tape must be maintained constant between exceedingly narrow limits in some operations where the overlap between turns is of minute dimensions.

The wire core is caused to advance longitudinally by means of a power operated capstan and the insulating tape is applied to the core in a helical wrap of overlapping turns by a power driven serving head. It is practically impossible to interconnect the capstan and the serving head by means of gear or belt systems, so as to secure the desired synchronism in operation. For example, the back lash in the gears and the changes in the belt tightness, or the changes in speed caused at the belt joint as it passes over the pulleys are sufficient to seriously limit the accuracy of this type of drive for such machines.

The system of this invention when applied to a wire insulating machine is such that any movement of either the capstan or the serving head will cause exactly the same or a proportionate movement of the serving head, and likewise, any movement of the serving head will cause a correct movement of the capstan. Furthermore, where several layers of insulation are simultaneously applied to the core, thus employing several serving heads, the invention assures accurate synchronism of the apparatus whether the motors be operating at the same speeds or at different speeds.

The most commonly used system of synchronous motor drive is that where two or more motors of the same size and same electrical characteristics are energized from the same alternating current source. In such systems it is common to have a one to one speed ratio between the motors because an attempt to maintain synchronism at any other speed ratio between two motors involves difficulties and complications which seriously limit the value of such systems. Such synchronous drives require special motors of the same size which have as similar electrical characteristics as it is possible to make them commercially. This of necessity increases the expense of manufacture of motors for such systems. Furthermore, to insure synchronism in starting special starting equipment is necessary. This equipment commonly employs apparatus which automatically operates when the circuit to the motors is closed, so as to start the motors on two of the phases and to bring the third phase into circuit by means of a time delay relay at the end of a predetermined period represented by the setting of the relay. This of course adds expense and complication to the system.

With the present invention all of these difficulties are eliminated. In the first place the system operates in substantially perfect synchronism not only in the case where motors operating at the same speeds are employed, but also where the speed ratios are other than one to one, such as one to three, one to four, and the like. The further advantage of this system is that no special starting equipment is necessary, and even the complications incident to operating two or more motors of other than one to one speed ratio do not prevent the system from starting in and maintaining substantially perfect synchronism, all without the necessity of special starting equipment.
A still further advantage of this system is found in the fact that the motors are not only of necessity of the same size, but may vary considerably in electrical characteristics without undesirable effect on the starting and operation of the system. Thus ordinary commercial motors may be employed without special regard to their electrical characteristics.

Finally, the system of this invention has the advantage that with the fields excited either motor may be manually turned in either direction without the apparatus losing step since the other motor will follow it exactly with a proportional movement, depending upon the speed ratios of the motor. This is not true of the ordinary synchronous motor drive system now commonly employed.

Referring to the drawings, Fig. 1 illustrates a system in accordance with this invention. A three phase power supply circuit is illustrated as one connected by means of the switch 2 to the circuit 1. The stator of the main motor, which is of course a three phase alternating current motor, is connected by the circuit wires 9 through the switch 8 to the circuit wires 7. The three phase rotor winding of the main motor is connected to the adjustable loading resistances 12 whereby the speed of that motor may be varied. The same circuit which feeds the stator 10 of the main motor feeds the stator 3 of an alternator whose rotor 5 is mechanically connected as indicated at 13 to the rotor of the main motor. The stator winding 4 of the second motor is connected to the stator winding 3 of the generator in series. Likewise, the rotor 6 of the second motor is connected to the rotor 5 of the generator in parallel thereto. The stators and rotors are shown as having a Y connection as will be apparent to those skilled in the art.

Assuming that this drive system is applied to a wire insulating machine, the main motor would be used to drive a capstan which is designed for feeding the wire longitudinally of its length. The main motor is directly connected to the generator, as diagrammatically illustrated in the drawings, so that the generator is driven whenever the capstan is operated. The second motor is the serving head motor, which motor operates the mechanism which applies the insulation in a helical wrap to the wire. The second motor, as is clear from Fig. 1, receives its excitation current in series with the generator from the circuit 7, so that when the system is in operation the current in the rotor circuit of the generator and second motor are balanced. Another feature of this system to be noted is, assuming that the alternating current supply source is a 220 volt circuit the windings of the generator and the second motor are 110 volt windings since they are in series across the line. The speed of the main motor may be varied by adjusting the loading resistances 12 in its rotor circuit. This will proportionately vary the speed of the second motor. When switch 2 is closed the stator of the generator is energized, as well as the stator of the second motor. As soon as switch 8 is closed the stator of the main motor is energized, setting it in operation. The alternator being connected to the main motor and its field energized immediately, supplies current in the rotor circuits which immediately becomes balanced, pulling the rotor of the second motor into step. The energization of the stator of the second motor with the main motor stationary does not cause the second motor to operate since the currents flowing in the rotor circuits of the second motor and the generator balance each other. The apparatus is only set in motion when the main motor is energized by the closing of switch 8. This system provides an absolute electrical driving tie-in between the motors and the parts driven thereby.

With the fields of the generator and the second motor energized, any movement of the main motor or of the second motor will cause movement of the entire system. Thus if the second motor is moved by hand the main motor will be moved a proportionate amount and vice versa. This is due to the fact that such movement unbalances the currents in the rotor circuits of the generator and the second motor, which immediately returns to balance by rotation thereof. From practical experience with such a system as applied to a wire insulating machine, it may be stated that this operation is for all practical purposes perfect, and with such a machine it has been possible to accomplish wire insulating operations not heretofore practical in a commercial sense.

The system of Fig. 4 differs from that of Fig. 1 only in that it illustrates a modification of the system in which the rotor of the main motor is mechanically connected with the rotor of the second motor, as diagrammatically illustrated at 13. In other respects the system is the same and the operation thereof is the same. The modification of Fig. 4 illustrates, however, the important point that the mechanical connection from the main motor may be to any other one of the machines of the system making it the generator. It may be here emphasized, for purposes of clarity, that the mechanical connection between the rotor of one of the motors of the system and the rotor of the generator may be provided by combining that motor and the generator into a single unit such as would be illustrated by the usual motor generator employing a single shaft for the two rotors. Of course, other equivalent mechanical connections may be used within the scope of the invention.

As illustrated in Fig. 1, it is entirely feasible with the system of this invention, to energize the rotors of the generator and the second motor from the alternating current source instead of the stators. As will be apparent to those skilled in the art, the operation of the system will be the same whether the rotors or the stators of the generator and the second motor are energized. It is hardly necessary to point out that the same reversible connections may be employed in the modified system.

The system of Fig. 2 is somewhat modified and expanded to show how two motors in addition to the main motor may be employed. Referring again to the wire insulating machine example, this system may be applied thereto where two serving heads are employed to apply two layers of insulation to the wires. The generator-stator 14 is supplied from the multi-phase current source as before, and is connected in series with the stators 15 and 16 of the second and third motors. The rotors 17, 18, and 19 respectively of these machines are connected in parallel as shown. The main driving motor has been omitted from this figure, but is employed and connected as before, and is mechanically connected to the generator-rotor as diagrammatically illustrated at 13.

The modified system of Fig. 3 is likewise shown with two motors driven from the generator. In this case the generator-stator 21 is energized from the current source 7, and is in series with the stator windings 22 and 23 of the second and third motors which are in parallel. The rotor windings 24, 25, and 26 of the generator and motors respectively are connected in parallel. The generator-rotor is again driven by the mechanical connection indicated at 13 from the main motor, which is also energized from the circuit 7. The stators of the second and third motors are capable of connection in parallel (and in series with the generator-stator as a unit) because these motors are of the same size and similar characteristics.

It is also pointed out that for the sake of clarity the elements have been termed motors and generators, although those skilled in the art will readily appreciate that structurally speaking they become neither until they are put into operation. Thus the generator may be employed as a motor, and the second motor or its equivalent may be employed as a generator, depending upon whether they are driving or supply current. In the related art the generator has often been referred to as a transmitter which supplies a current controlled, so to speak, by the main motor to the second motor to insure that the desired electrical tie-in is secured and maintained. The system may be referred to as a sort of an electrical gear system in which operation of any one of the parts will cause a simultaneous operation of the other parts if the fields of the transmitter and the second motor are energized.

From the above description it will be apparent that this invention resides in certain systems of associated elements to provide synchronized motor drive for a plurality of members to be operated in timed relation. Those skilled in the art will readily appreciate variations in the manner of associating the elements to accomplish this invention without departure from the scope of the invention. I do not, therefore, desire to be strictly limited to the disclosure as given for purposes of illustration, but rather to the scope of the appended claims.

What I seek to secure by United States Letters Patent is:

1. A synchronized drive system of the type described comprising a polyphase alternating current supply circuit, a polyphase motor energized from said circuit, a polyphase transmitter comprising a fixed winding and a rotatable winding, a second polyphase motor having a fixed winding and a rotatable winding, means for connecting the fixed windings of the transmitter and second motor in series with said alternating current source, connections between the rotors of the transmitter and the second motor, and means for operating the transmitter by the first mentioned motor.

2. A synchronized drive system of the type described comprising a polyphase alternating current supply circuit, a polyphase motor energized from said circuit, a polyphase transmitter having a fixed winding and a rotatable winding, means for driving the rotatable winding from said motor, a second polyphase motor having a fixed winding and a rotatable winding, means for connecting a pair of corresponding windings of the transmitter and the second motor in series with said source, and connections between the other windings of said transmitter and second motor.

3. A synchronized drive system of the type described comprising a polyphase alternating current source, a polyphase motor energized from said source, a polyphase generator having a stator and a rotor, a second polyphase motor having a stator and a rotor, means for connecting the stators of the generator and the second motor in series to said source, connections between the rotor of the generator and the second motor, and means for mechanically connecting the rotor of the first mentioned motor to the rotor of the generator.

4. A synchronized drive system of the type described comprising a polyphase alternating current supply circuit, a polyphase motor energized from said circuit, a polyphase generator having a stator and a rotor, a second polyphase motor having a stator and a rotor, means for connecting the rotors of the generator and the second motor in series with said supply circuit, connections between the stators of the generator and the second motor, and mechanical means for connecting the rotor of the main motor to the rotor of the generator.

5. A synchronized drive system of the type described comprising a polyphase alternating current supply circuit, a polyphase motor generator having the stator of the motor and the generator energized from said current source, a second polyphase motor having its stator connected in series with the stator of the generator, and means electrically connecting the rotor of the generator and the second motor in series.

6. A synchronized motor drive system as described comprising a polyphase alternating current power source, a multi-pole polyphase alternator, comprising a stator winding and a rotor winding, a main polyphase motor mechanically connected to the generator and having a stator winding and a rotor winding, connections between the stators of the generator and the main motor and said source, a second polyphase motor comprising a stator winding and a rotor winding, means connecting the stator winding of the second motor in series with the stator winding of the generator, the number of poles of the second motor being a multiple of the number of poles of the generator, and electrical connections between the rotors of the generator and the second motor.

7. A synchronously tied motor system comprising a polyphase alternating current source, a main polyphase motor energized from said source, a polyphase generator having a stator and a rotor, a second and a third polyphase motor each having a stator and rotor, means for connecting the stators of the generator, the second and third motor in series with said source, electrical connections between the rotors of the generator, the second motor and the third motor, and a mechanical connection between the rotor of the main motor and the rotor of the generator.

8. A synchronized motor system as described comprising a polyphase alternating current source, a main polyphase motor energized from said source, a polyphase generator having a fixed and a movable winding, second and third polyphase motors each having fixed and movable windings, means for connecting the fixed windings of the generator, second and third motors in series with said source, means for connecting the movable windings of the generator and the second and third motors in parallel, and a mechanical connection between the rotor of the main motor and the movable winding of the generator.

9. A synchronized motor system as described comprising a polyphase alternating current source, a main polyphase motor energized from said source, a polyphase generator having a fixed and a movable winding, second and third polyphase motors each having a fixed and a movable winding, means for connecting the movable windings of the generator and the second and third motors in series with said source, means for connecting the fixed windings of the generator, second and third motor in parallel, and a mechanical connection between the rotor of the main motor and the movable winding of the generator.

10. A synchronized motor drive system of the type described comprising a polyphase alternating current source, a main polyphase motor energized from said source, a polyphase generator having a fixed and a movable winding, a second and a third polyphase motor each having a fixed and a movable winding, means for connecting the fixed windings of the second and third motors together in parallel and in series as a unit with the fixed winding of the generator and said source, means for connecting the rotors of the generator, the second motor and the third motor in parallel, and a mechanical connection between the rotor of the main motor and one of the movable windings of the generator.

11. A synchronized motor drive system of the type described comprising a polyphase alternating current source, a main polyphase motor energized from said source, a polyphase generator having a fixed and a movable winding, second and third polyphase motors each having fixed and movable windings, means for connecting the movable windings of the second and third motors together in parallel, and in series as a unit with the movable winding of the generator, means for connecting the fixed windings of the generator, second and third motors in parallel, and a mechanical connection between the rotor of the main motor and the movable winding of the generator.

12. A synchronized drive system of the type described comprising a multiphase generator and two multiphase motors, the generator and motors each having a primary and a secondary winding, a multiphase alternating current source, circuit connections from said source to the primary of one of said motors, circuit connections for energizing the primaries of the generator and the other motor in series from said source, circuit connections between the secondaries of said generator and said other motor and a mechanical connection between the generator and one of said motors.

13. A synchronized drive system of the type described comprising a multiphase generator, a plurality of multiphase motors, one of which is a main motor, the generator and motors each having a primary winding and a secondary winding, one winding of each machine being rotatable, a multiphase alternating current source connected to the primary winding of the main motor, circuit connections from the source to the other motor primary windings for energizing them in series with primary winding of the generator, circuit connections between the secondary windings of the generator and said other motors and a mechanical connection between the rotatable winding of the generator and the rotatable winding of the main motor.

EDWARD G. PARVIN.